Sept. 6, 1938.  E. C. HORTON  2,129,619
WINDSHIELD CLEANER
Filed Aug. 30, 1935
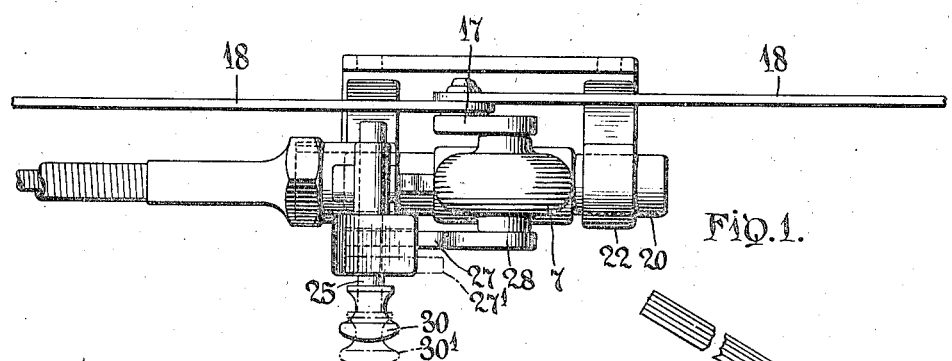
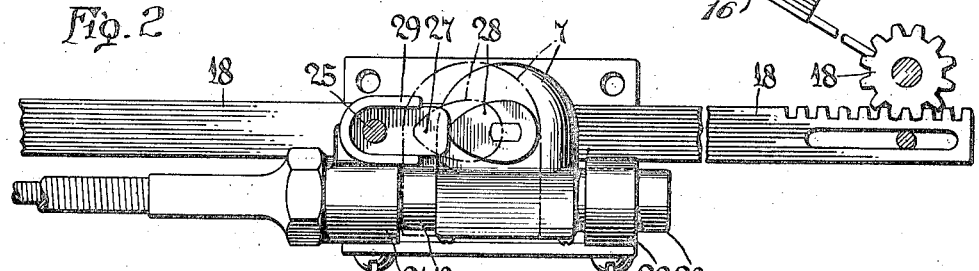
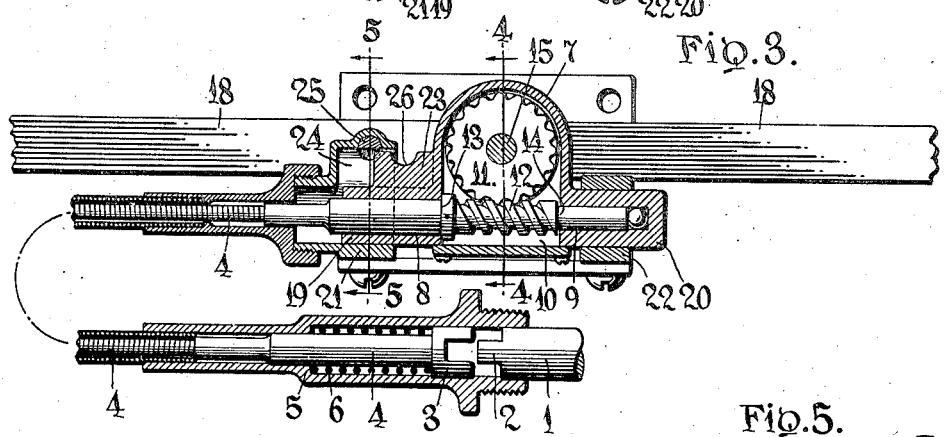
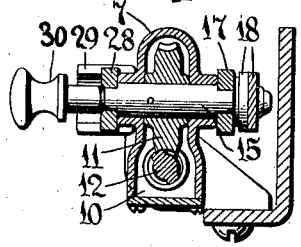
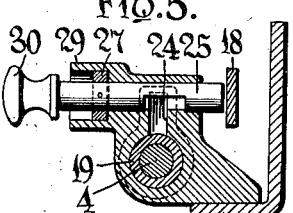
INVENTOR
Erwin C. Horton,
BY
Beau, Brooks, Buckley & Beau,
ATTORNEYS Patented Sept. 6, 1938

2,129,619

UNITED STATES PATENT OFFICE 2,129,619

WINDSHIELD CLEANER

Erwin C. Horton, Hamburg, N. Y., assignor to Trico Products Corporation, Buffalo, N. Y.

Application August 30, 1935, Serial No. 38,609

7 Claims. (Cl. 15—255)

This invention relates to a windshield cleaner and particularly to that type which is mechanically driven from the vehicle engine or some other moving part thereof.

The invention relates primarily to a windshield cleaner of this type in which the wiper may be parked outside of the field of vision which is normally cleaned thereby. It has heretofore been proposed to incorporate a spring device in the windshield cleaner assemblage for parking the wiper when the cleaner is shut off. This manner of parking, however, is accomplished indirectly and involves the services of additional parts.

The present invention comprehends the provision of a cleaner in which the operating power is directly applied for effecting the desired parking of the wiper, the object of the invention being to simplify the cleaner and parking construction and to accomplish the parking of the wiper in a more efficient manner.

In the drawing, which depicts one embodiment of the invention,

Fig. 1 is a fragmentary top plan view of the windshield cleaner head in its wiper parking position;

Fig. 2 is a side elevation thereof;

Fig. 3 is a vertical section therethrough and depicting the shaft transmission leading to the source of power;

Figs. 4 and 5 are detailed sectional views about on lines 4—4 and 5—5, respectively, of Fig. 3.

Referring more particularly to the drawing, numeral 1 designates the source of power for driving the windshield cleaner, the same being illustrated in the form of a shaft which may derive its power from the power plant of the vehicle. This shaft is provided with a clutch part 2 adapted to cooperate with a clutch part 3 on the transmission shaft 4 in detachably coupling the cleaner to its drive. The shaft 4 is journaled in the clutch housing 5 and is also slidable axially therein so as to disengage clutch part 3 from clutch part 2 when it is desired to park the windshield cleaner. A spring 6 within the housing 5 normally acts to urge the clutch parts into operative relationship with each other.

The transmission shaft is connected at its opposite end to a windshield cleaner head generally indicated at 7. This head is provided with bearings 8 and 9 for the adjacent end of the shaft 4, and between these bearings is a gear chamber 10 in which is disposed the intermeshing worm gear 11 and worm 12. The worm is fixed to the shaft 4 and is constrained therewith against axial shifting in the head, as by thrust bearing shoulders 13 and 14. The worm gear 11 is fixed to the wiper actuating shaft 15. The wiper 16 may be connected directly to the shaft 15 when a single wiper is used, or it may be provided, as shown, with a crank arm 17 for connection by the linkage 18 to a plurality of wipers (only one of the plural wipers being shown).

The wiper head 7 has guiding extensions 19 and 20 slidable in guideways 21 and 22 and serving to support the head for movement from its operative position (shown in broken lines) to the full line position for parking the wiper element. The head may be constrained to a movement substantially parallel to the axis of the shaft bearings 8 and 9 by a rib or spline 23 on the guide extension 19 fitting in the guideway 24. To secure the head against movement when the clutch parts are in operative engagement for driving the cleaner, a lock pin 25 is engaged in a seat 26 of the spline 23, the pin being slidably supported in transverse bearings in the walls of the guideway 24 and equipped with a knob 30 by which it may be actuated.

For parking the wiper the head is released from the pin by withdrawing the latter from the seat 26, and following this removal a mechanism is brought into play to effect an automatic disengagement of the clutch part 3 from its driving part 2. To this end an abutment 27 is movable into the path of a rotating cam 28 on the wiper actuating shaft 13 whereby the driven cam may ride thereon to effect such head movement. The abutment is connected to the lock pin for being brought into the path of the cam upon the withdrawing of the lock pin from the seat 26. Guideway 29 serves to hold the abutment firmly during the cam engagement. The parking shift of the head exerts a pull on the flexible shaft 4 and compresses the spring 6 as the clutch part 3 is disengaged from the drive.

In starting the cleaner the pin is withdrawn to the broken line position 30', Fig. 1, to remove the abutment from engagement with the cam 28, and from its path, to the broken line position 27'. Upon release of the cam the spring 6 will urge the clutch part 3 into coupling relation to the driving clutch part 2 and subsequent thereto the pin 25 may be moved into the seat 26 to secure positively such engagement. When it is desired to arrest the wiper the pin is moved to the full line showing, Fig. 1, which disengages the pin from the seat 26 and disposes the abutment 27 in the path of cam 28 so that when the cam engages the abutment and rides thereon, it will move the head to the right and pull on the shaft 4 to withdraw the clutch part 3 from engagement with its companion part. During this movement of the head the shifting axis of the crank arm 17 will shift the axis of oscillation of the wiper so as to bring it to rest outside of the cleaned area as the clutch parts uncouple.

The wiper is thus brought to a parked position by the driving power of the cleaner and in a direct manner without the intervention of spring means or other mechanism which tends to involve the structure and increase the costs.

It will be understood further that the mechanism shown and described is merely illustrative of the inventive principles involved, which may be applied to other physical embodiments without departing from the scope and spirit of the invention claimed.

I claim:

1. In a window cleaner, an actuating shaft, a movably mounted head in which the shaft is journaled, a drive for the shaft, transmission means connecting the shaft to the drive and having a part journaled in the head for movement therewith and with the shaft as a unit for rendering the drive ineffective on the shaft, an abutment adjacent the head, and a cam movable with the cleaner mechanism and ridable upon the abutment to cam the head away therefrom and thereby effect such movement of the head, shaft and transmission part as a unit to arrest the shaft, said abutment and cam being relatively movable to normally dispose the one inoperative to the other.

2. In a window cleaner, an actuating shaft, a drive for the shaft, transmission means operatively connecting the drive to the shaft and including a clutch for disconnecting the drive from the shaft, said transmission means including a part movable bodily with said shaft to effect such disconnection, a movable support for said shaft and transmission part, a cam rotatable with the shaft, and abutment means movable into the path of the cam for camming engagement thereby to shift the support and effect such bodily movement of said transmission part and shaft.

3. In a window cleaner mechanism, an actuating shaft, a head in which the shaft is journalled, means supporting the head for movement to shift the axis of the shaft, a drive, a transmission connected to the shaft and embodying a clutch detachably connecting the drive thereto, said transmission being movable with the head as a unit to unclutch the shaft from the drive, a cam fixed on the shaft, an abutment movable into the path of the cam for being engaged thereby to effect such movement of the head, and means for securing the head against movement when the mechanism is operative.

4. In a window cleaner, an actuating shaft, a head in which the shaft is journalled, means supporting the head for movement to shift the axis of the shaft, a drive having a clutch part, a transmission connected to the actuating shaft and embodying a driven clutch part cooperable with the driving clutch part to operate the shaft, said transmission being movable with the head to engage and disengage the driven clutch part with the drive clutch part, means for normally holding the clutch parts in operative relationship, a rotating cam operable by the transmission and carried by the head, and an abutment movable into the path of the cam for camming engagement thereby to shift the head and thereby disconnect the transmission from its drive.

5. In a window cleaner, an actuating shaft, a head in which the shaft is journalled, means supporting the head for movement between an operating position and a parking position, a drive, a transmission connected to the shaft and embodying a clutch detachably connecting the drive thereto, said transmission being movable with the head as a unit to unclutch the shaft from the drive, and means operable by and during operation of the transmission for moving the head to the parking position.

6. In a window cleaner mechanism, an actuating shaft, a head in which the shaft is journalled, means for supporting the head for movement between an operating position and a non-operating position, a drive, a transmission connected to the shaft and embodying a clutch releasably connecting the drive thereto, said transmission including means connected to the head for movement therewith for releasing the clutch when the head is moved to said non-operating position, and means for moving the head including a cam movable with a part of the cleaner mechanism and an abutment movable into the path of the cam and on which the cam will ride.

7. In a window cleaner, an actuating shaft, a head in which the shaft is journalled, means supporting the head for slidable movement to shift the shaft laterally, a drive having a clutch part, a transmission connected to the shaft and embodying a driven clutch part, said transmission being connected to the head for movement therewith as a unit to engage and disengage its clutch part with the drive clutch part, a member connected to the shaft to move therewith, and means movable into the path of said member to be engaged by the latter for causing movement of the head and therethrough the disengagement of the clutch part by and during continued movement of the transmission.

ERWIN C. HORTON.